United States Patent [19]

Danby et al.

[11] Patent Number: 5,434,771
[45] Date of Patent: Jul. 18, 1995

[54] ADAPTIVE HARMONIC DISTORTION CONTROL FOR PARALLEL CONNECTED INVERTERS

[75] Inventors: Clive M. Danby; Robert G. Glass, both of Rockfort, Ill.

[73] Assignee: Sundstrand Corporation, Rockford, Ill.

[21] Appl. No.: 167,436

[22] Filed: Dec. 14, 1993

Related U.S. Application Data

[63] Continuation of Ser. No. 758,581, Sep. 12, 1991, abandoned.

[51] Int. Cl.⁶ .......................................... H02M 7/515
[52] U.S. Cl. ........................................ 363/71; 363/41; 363/64
[58] Field of Search .................... 363/40, 41, 64, 71, 363/72; 323/207

[56] References Cited

U.S. PATENT DOCUMENTS

| | | | |
|---|---|---|---|
| 3,327,202 | 6/1967 | Mills | 323/22 |
| 3,586,960 | 6/1971 | Hingorami | 321/9 |
| 3,614,589 | 10/1971 | Ireland et al. | 363/43 |
| 3,657,633 | 4/1972 | Urish | 321/9 |
| 3,883,792 | 5/1975 | Ellert | 321/9 |
| 3,889,090 | 6/1975 | Mackenzie | 219/10 |
| 3,943,429 | 3/1976 | Heintze | 321/26 |
| 4,204,264 | 5/1980 | Lipman | 363/71 |
| 4,358,818 | 11/1982 | Rosa | 363/46 |
| 4,387,421 | 6/1983 | Zach et al. | 364/148 |
| 4,480,299 | 10/1984 | Muto et al. | 363/41 |
| 4,549,258 | 10/1985 | Honbu et al. | 363/71 |
| 4,635,177 | 1/1987 | Shekhawat et al. | 363/41 |
| 4,646,221 | 2/1987 | Sekino et al. | 363/41 |
| 4,677,535 | 6/1987 | Kawabata et al. | 363/65 |
| 4,685,042 | 8/1987 | Severinsky | 363/41 |
| 4,800,478 | 1/1989 | Takahashi | 363/41 |
| 4,802,079 | 1/1989 | Mizoguchi | 363/71 |
| 4,849,870 | 7/1989 | Heinrich | 363/37 |
| 5,016,158 | 5/1991 | Matsui et al. | 363/71 |
| 5,047,909 | 9/1991 | Hosoda | 363/40 |
| 5,051,684 | 9/1991 | Angquist | 323/207 |
| 5,065,303 | 11/1991 | Nguyen et al. | 363/40 |
| 5,070,440 | 12/1991 | Walker | 363/71 |
| 5,168,437 | 12/1992 | Gyugi et al. | 363/42 |
| 5,212,629 | 5/1993 | Jessee | 363/42 |

*Primary Examiner*—Steven L. Stephan
*Assistant Examiner*—Adolf Berhane
*Attorney, Agent, or Firm*—Jeffery J. Makeever

[57] ABSTRACT

A control for an inverter system having first and second inverters that produce inverter outputs wherein the inverter outputs are combined by an interphase transformer (IPT) to produce an AC output includes circuitry for detecting a magnitude of a harmonic component in the AC output waveform and circuitry for developing first and second PWM control waveforms for controlling the first and second inverters, respectively. The second PWM control waveform is phase delayed relative to the first PWM control waveform to in turn regulate the magnitude of the harmonic component and DC content across the IPT is controlled to prevent damage to the IPT.

12 Claims, 6 Drawing Sheets

ADAPTIVE HARMONIC DISTORTION CONTROL FOR PARALLEL CONNECTED INVERTERS

This is a File Wrapper Continuation of U.S. application Ser. No. 07/758,581, filed Sep. 12, 1991, now abandoned.

TECHNICAL FIELD

The present invention relates generally to inverter controls, and more particularly to an adaptive control for parallel connected inverters.

BACKGROUND ART

Variable-speed, constant-frequency (VSCF) power generating systems utilize a brushless, synchronous generator driven by a variable-speed prime mover. The generator produces variable-frequency AC power which is rectified and supplied over a DC link to a DC/AC converter that converts same into constant-frequency AC power. Often, the level of power required to be handled by the DC/AC converter is such as to necessitate the use of parallel connected inverters therein. In this case, it may be necessary or desirable to interconnect corresponding phase outputs of the inverter using interphase transformers that balance the currents supplied by the inverters.

When variable, unbalanced and reactive three-phase loads are connected to the inverters, harmonic distortion can become quite significant, particularly between phase outputs. If no compensation is provided for these harmonics, the distortion can rise above acceptable levels.

It has been recognized that the phase displacement between parallel connected inverter outputs affects the harmonics produced thereby. For example, Lipman, U.S. Pat. No. 4,204,264 discloses a multi-bridge three-phase converter wherein the phase displacements between parallel connected converter outputs are maintained at fixed, predetermined values to cancel one or more harmonics in the overall converter output.

Heinrich, U.S. Pat. No. 4,849,870 discloses a method of operating an AC drive having parallel DC link power converters wherein the phase shift between corresponding inverter outputs is made equal to a predetermined, fixed value, such as 30°, to reduce the magnitudes of certain harmonics in the inverter output. Heinrich specifically discloses at column 6, lines 18-23 that the phase shift and magnitude of power converter channels may be controlled independently. However, no disclosure or suggestion is made as to how or by what means this could be accomplished.

Several patents disclose controls for multiple inverters connected by interphase transformers. These patents include Urish, U.S. Pat. No. 3,657,633, Ellert, U.S. Pat. No. 3,883,792, Heintze, U.S. Pat. No. 3,943,429, Zach, et al., U.S. Pat. No. 4,387,421, Muto, et al., U.S. Pat. No. 4,480,299, Honbu, U.S. Pat. No. 4,549,258, Shekhawat, et al., U.S. Pat. No. 4,635,177 (assigned to the assignee of the instant application), Sekino, et al., U.S. Pat. No. 4,646,221, Severinsky, U.S. Pat. No. 4,685,042, Takahashi, U.S. Pat. No. 4,800,478 and Mizoguchi, U.S. Pat. No. 4,802,079.

None of the systems disclosed in the foregoing patents attempts to regulate or control the magnitude of harmonics in the output of parallel connected inverters in a closed loop fashion to account for varying load conditions.

SUMMARY OF THE INVENTION

In accordance with the present invention, a control for an inverter system having parallel connected inverters detects one or more load conditions and controls one or more operating parameters to in turn regulate or control the output thereof.

More particularly, in accordance with one embodiment of the invention, a control for an inverter system having first and second inverters that produce inverter outputs and means for combining the inverter outputs to produce an AC output waveform includes means for detecting a magnitude of a harmonic component in the AC output waveform and means responsive to the detecting means for developing first and second pulse-width modulated (PWM) control waveforms for controlling the first and second inverters, respectively. The developing means includes means for phase delaying the second PWM control waveform relative to the first PWM control waveform to in turn regulate the magnitude of the harmonic component.

In accordance with one aspect of this embodiment, the developing means further includes means for adjusting the widths of selected pulses in one of the PWM control waveforms in dependence upon the magnitude of the harmonic component.

In accordance with a further aspect of this embodiment, the developing means includes means for adjusting the widths of selected pulses in both of the PWM control waveforms in dependence upon the magnitude of the harmonic component.

In accordance with yet another aspect, the detecting means further includes means for sensing the magnitude of a DC component in one of the inverter outputs and the developing means is further responsive to the sensing means.

In accordance with still another aspect, the detecting means further includes means for sensing magnitudes of DC components in both of the inverter outputs and the developing means is further responsive to the sensing means.

Still further, the developing means is preferably responsive to the sensing means and may be further responsive to a magnitude of the AC output waveform.

In accordance with a further embodiment of the present invention, an inverter system includes first and second inverters that produce inverter outputs and an interphase transformer that combines the inverter outputs to produce an AC output waveform. A digital signal processor includes means responsive to the AC output waveform and develops first and second PWM control waveforms for controlling the first and second inverters, respectively. The second PWM control waveform is phase delayed relative to the first PWM control waveform by an amount dependent upon magnitudes of harmonics in the AC output waveform. Further, widths of pulses in the PWM control waveforms are controlled in dependence upon magnitudes of harmonics in the AC output waveform. Preferably, the widths of pulses in the PWM control waveforms are further controlled in accordance with a magnitude of a fundamental component of the AC output waveform. Also preferably, the inverter system further includes means for detecting magnitudes of DC components in the inverter outputs and the widths of pulses in the PWM control waveforms are controlled in accordance with the magnitudes of the DC components.

In accordance with yet another embodiment of the present invention, an inverter system includes first and second inverters each of which produces a plurality of phase outputs and an interphase transformer that combines corresponding phase outputs of the first and second inverters to produce a plurality of AC phase output waveforms. A digital signal processor includes means responsive to the AC output waveform and the phase outputs of the inverters for developing first and second sets of PWM control waveforms for controlling the first and second inverters, respectively. The second PWM control waveform is phase delayed relative to the first PWM control waveform by an amount dependent upon the magnitudes of harmonics in the AC output waveform and the widths of pulses in the PWM control waveforms are controlled in dependence upon the magnitudes of harmonics in the AC output waveform.

Preferably, the widths of pulses in the PWM control waveforms are further controlled in accordance with a magnitude of a fundamental component of the AC output waveform. Also preferably, the inverter system further includes means for detecting magnitudes of DC components in the inverter outputs and the widths of pulses in the PWM control waveforms are further controlled in accordance with the magnitudes of the DC components.

The present invention is effective to regulate one or more harmonics in the output of parallel connected inverters on a closed loop basis and is thus able to account for varying load conditions. This ability in turn permits a wide variety of AC loads to be connected to the inverter system in varying combinations.

DESCRIPTION OF THE PREFERRED EMBODIMENTS

Figure 1:
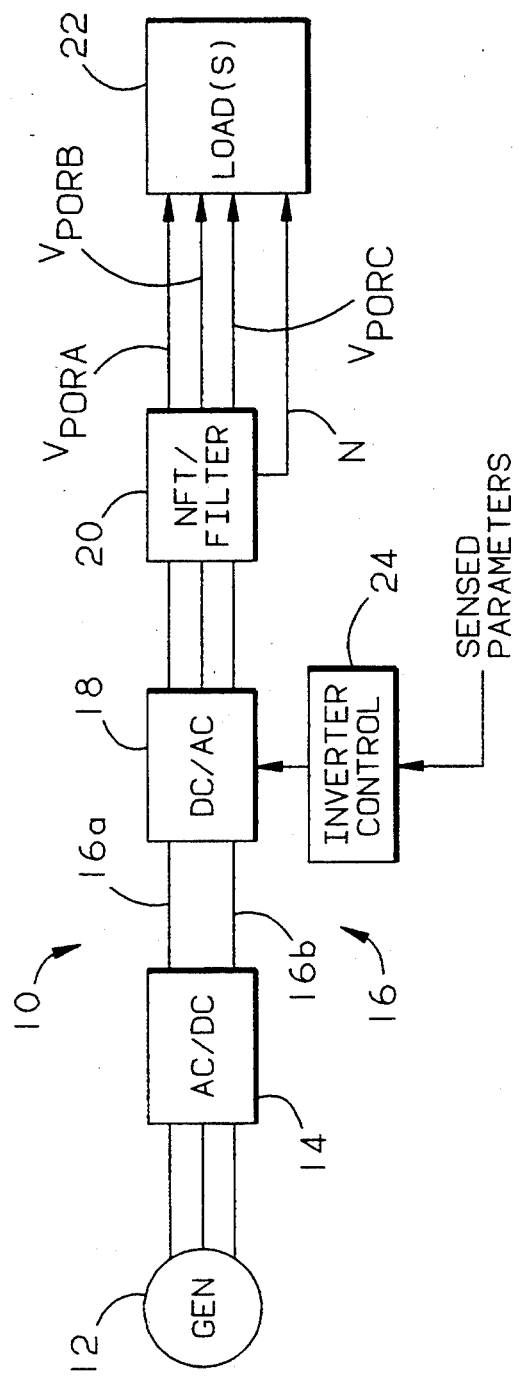
FIG. 1 comprises a generalized block diagram of a power generating system incorporating an inverter system according to the present invention.

Referring now to FIG. 1, a power generating system 10 includes a brushless, synchronous generator 12 which may comprise, for example, an aircraft jet engine that operates at a variable speed. The generator 12 develops variable-frequency power which is supplied to an AC/DC converter or rectifier 14 that in turn develops DC power on a DC link 16 comprising first and second DC link conductors 16a, 16b. The DC link conductors 16a, 16b are coupled to and supply DC power to a DC/AC converter 18 which in turn develops constant-frequency AC power therefrom. The AC power is thereafter supplied to a neutral forming transformer and filter 20 which develops phase voltages $V_{PORA}$, $V_{PORB}$ and $V_{PORC}$ at a point of regulation (POR). These voltages as well as a neutral voltage N are supplied to one or more loads. It should be noted that various contactors for connecting the loads to the power generating system 10 are not shown for the sake of simplicity. As noted previously, the loads may be variable in the sense that differing load combinations may be connected to the power generating system 10 at different times. In addition, other load conditions may change over time and unbalanced loads may be encountered. These varying load conditions can cause harmonics to be developed in the POR phase voltages. In order to compensate for these changes in load conditions, an inverter control 24 operates the DC/AC converter 18 in response to sensed parameters so that waveforms of appropriate shape are produced thereby to fully or partially cancel one or more harmonics therein.

Figure 2:
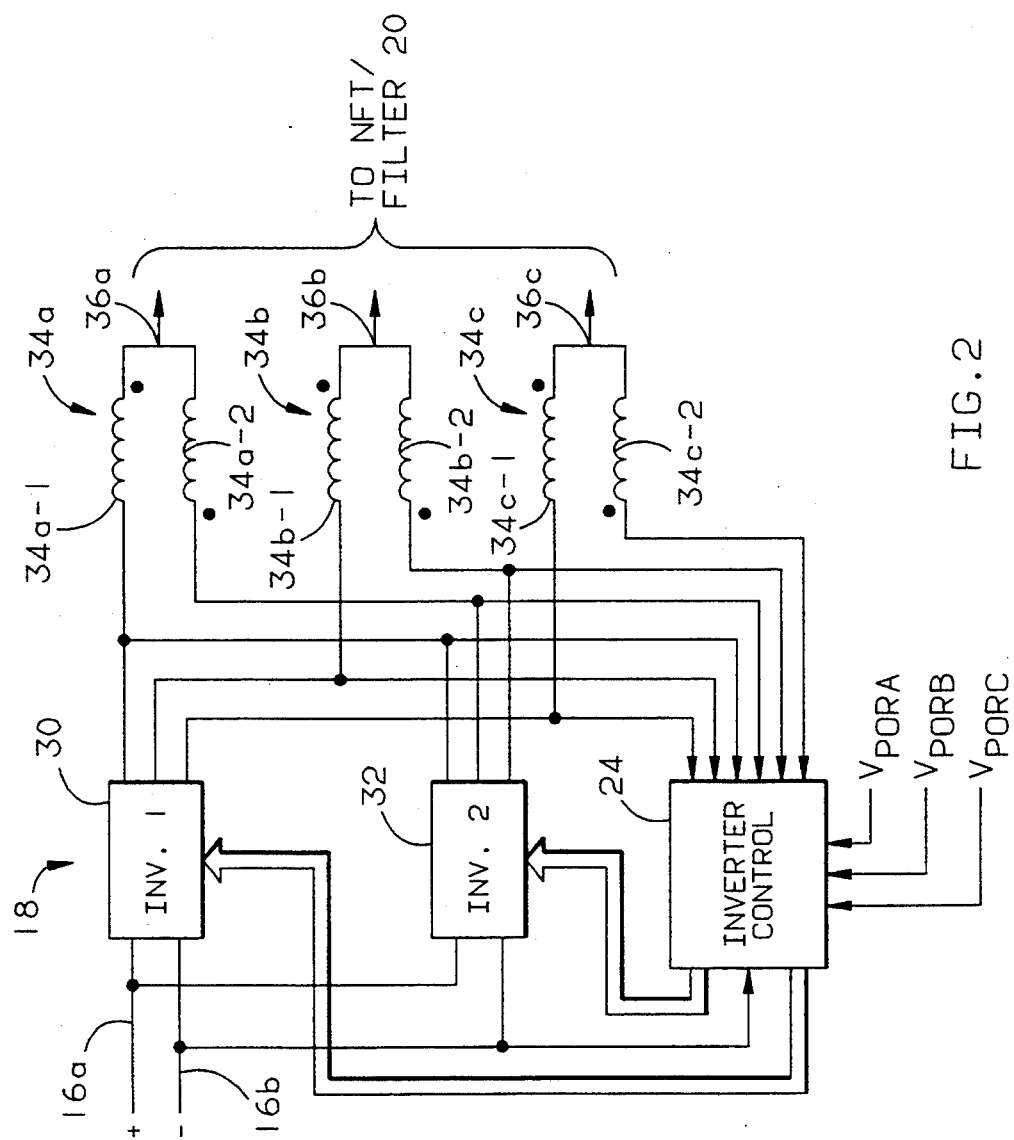
FIG. 2 comprises a combined block and simplified schematic diagram of the inverter system according to the present invention.
Figure 3:
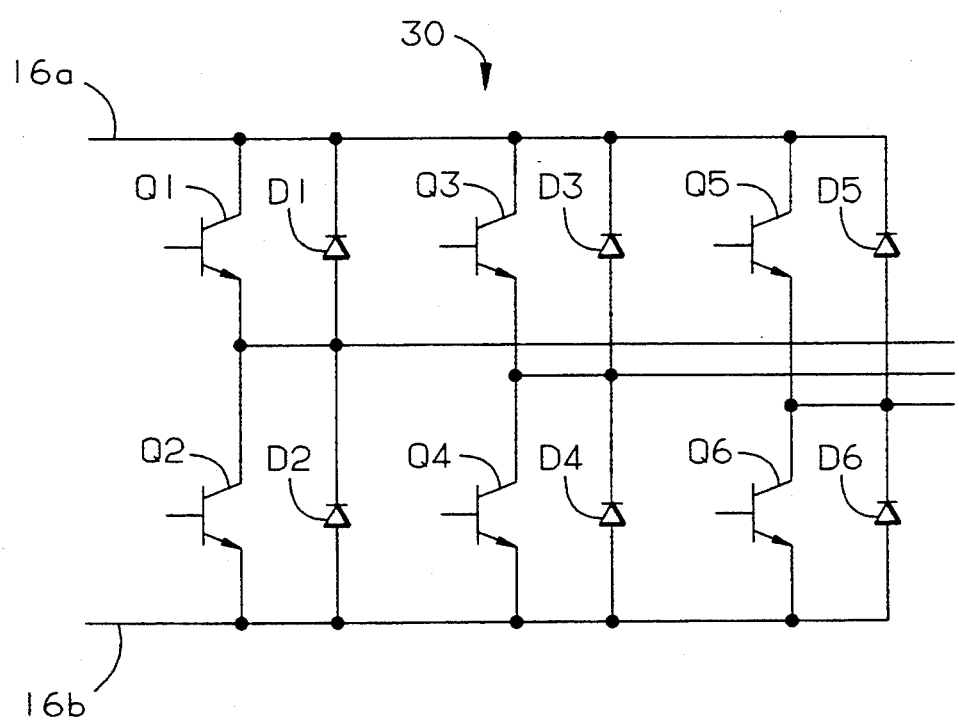
FIG. 3 comprises a simplified schematic diagram of one of the inverters of FIG. 2.

Referring now to FIG. 2, the DC/AC converter 18 includes first and second inverters 30, 32, each of which comprises a plurality of power switches connected in a bridge configuration. More particularly, FIG. 3 illustrates in simplified form the switch topology of the inverter 30, it being understood that the inverter 32 is identical thereto. The inverter 30 includes first through sixth power switches Q1–Q6 which are connected together in a conventional three-phase bridge configuration across the DC link conductors 16a, 16b. First through sixth flyback diodes D1–D6 are connected across the first through sixth power switches Q1–Q6 in antiparallel relationship therewith. It should be noted that each switch Q1–Q6 may, in reality, comprise two or more parallel connected power transistors, thyristors or other switching devices as required to obtain the proper switching speeds, current and voltage handling capabilities and the like.

Referring again to FIG. 2, corresponding phase outputs of the inverters 30, 32 are interconnected by interphase transformers 34a–34c. More particularly, the phase A outputs of the inverters 30, 32 are connected to end taps of windings 34a-1 and 34a-2, respectively. Likewise, phase B outputs of the inverters 30, 32 are connected to end taps of windings 34b-1, 34b-2 of the interphase transformer 34b while the phase C outputs of the inverters 30, 32 are connected to end taps of windings 34c-1, 34c-2 of the interphase transformer 34c. Overall phase outputs of the converter 18 are developed at mid taps 36a–36c of the interphase transformers 34a–34c, respectively. The interphase transformers 34a–34c combine the corresponding phase outputs of the inverters 30, 32 and provide impedance barriers between the two.

The inverter control 24 is responsive to the phase outputs of the inverters 30, 32, the fundamental component of the POR voltages $V_{PORA}$, $V_{PORB}$ and $V_{PORC}$ and the zero volt DC voltage on the DC link conductor 16b. The inverter control 24 develops pulse-width modulated (PWM) control waveforms for controlling the switches in the inverters 30, 32 to: (1) maintain the fundamental component of the output voltages $V_{PORA}$, $V_{PORB}$ and $V_{PORC}$ at a regulated level; (2) minimize DC content in the outputs of the inverters 30, 32 to in turn control DC across the IPT's 34a–34c so that overheating of the IPT's is prevented; and (3) regulate harmonics in the output of the power generating system 10.

Figure 4:
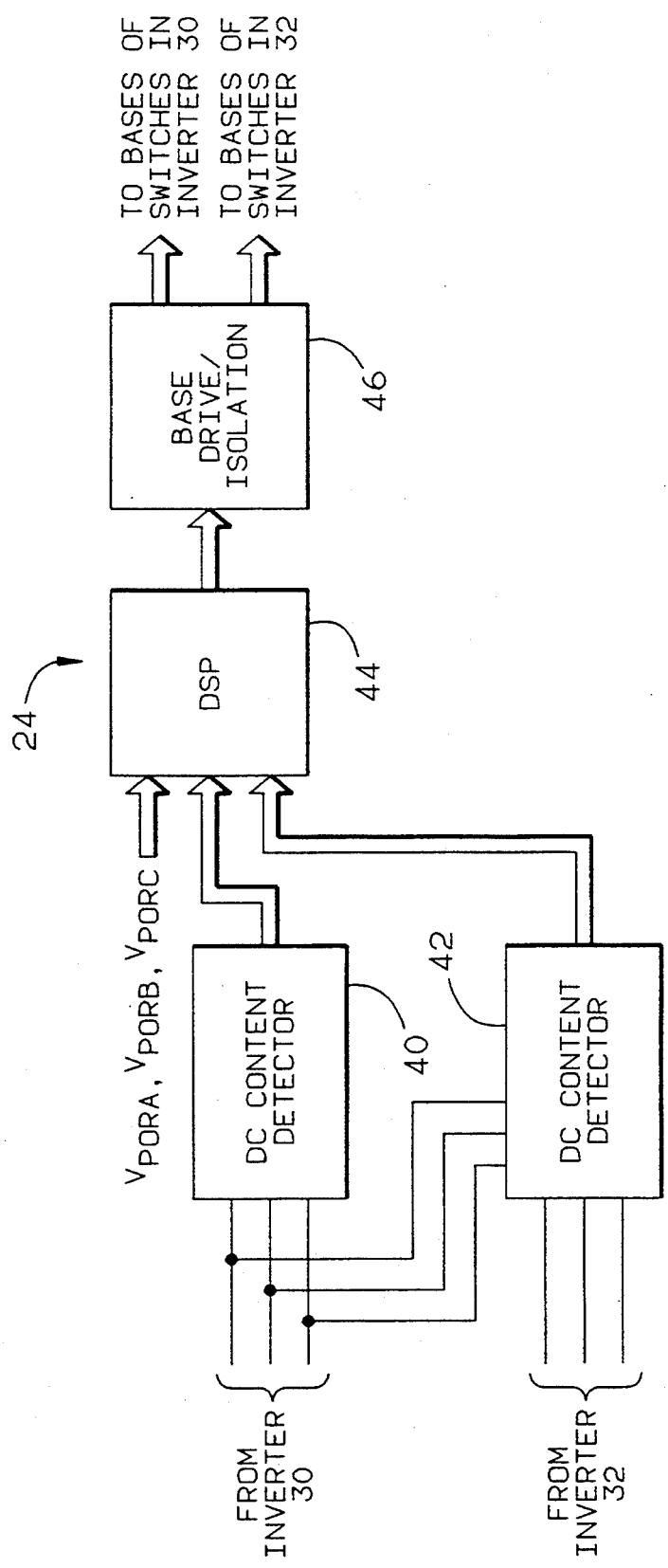
FIG. 4 comprises a block diagram of the inverter control of FIG. 2.

With reference to FIG. 4, the inverter control 24 includes first and second DC content detectors 40, 42, respectively. The DC content detector 40 is responsive to the phase outputs of the inverter 30 and detects the DC content in each phase output with reference to the zero volt DC link voltage on the DC link conductor 16b. The DC content detector 42 is responsive to the phase outputs of the inverter 32 and detects the DC content present in each phase relative to the DC content in the corresponding phase output of the inverter 30. The DC content signals representing the DC content in each phase output of the inverters 30, 32 referenced as noted above are supplied together with the POR voltages $V_{PORA}$, $V_{PORB}$ and $V_{PORC}$ to a digital signal processor (DSP) 44. The DSP 44 develops a series of pulse-width modulated (PWM) control waveforms that are in turn provided to a base drive and isolation circuit 46. The circuit 46 provides amplification and isolation as needed to drive the switches in the inverters 30 and 32.

Figure 5:
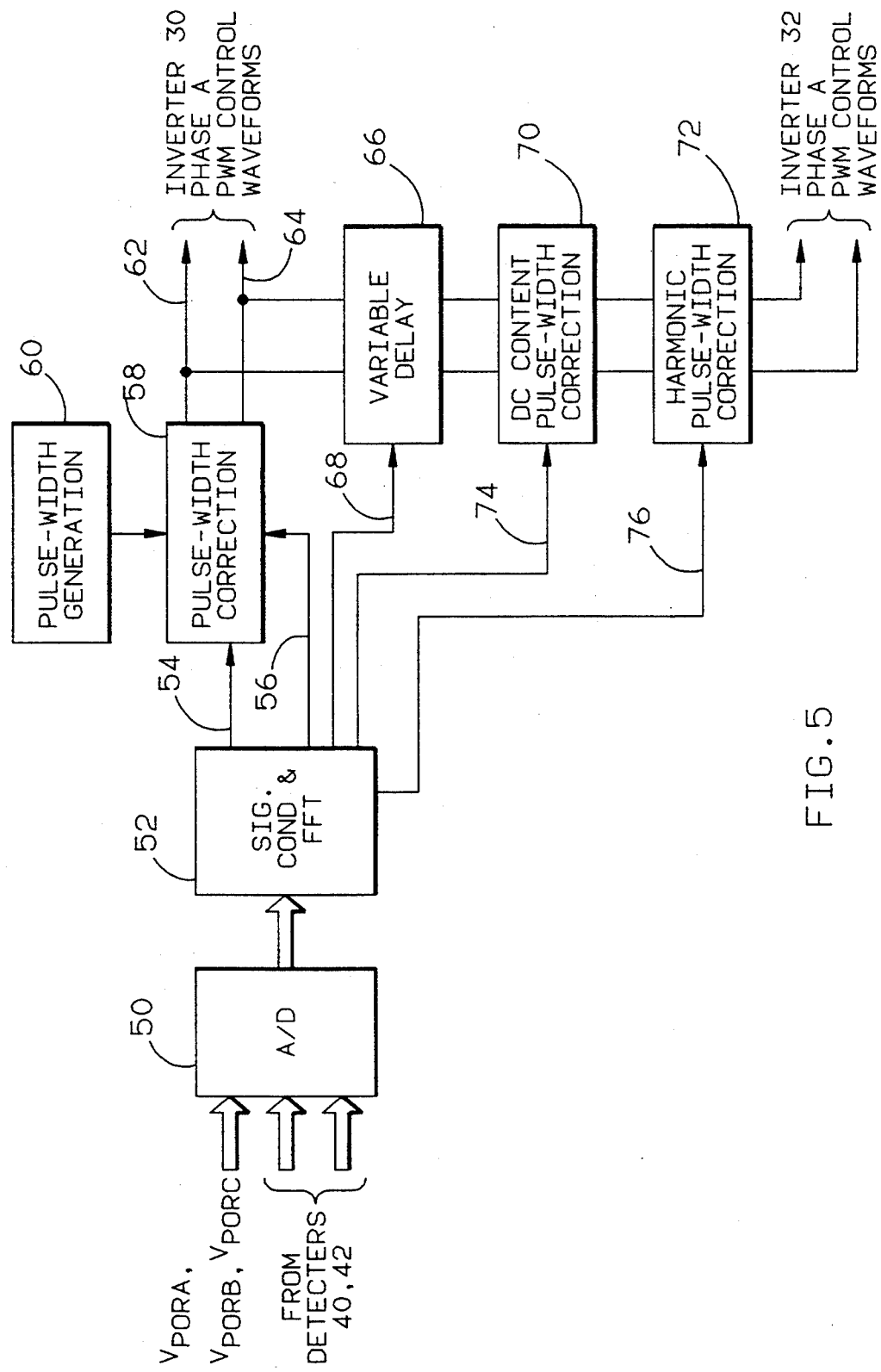
FIG. 5 comprises a block diagram of the digital signal processor (DSP) of FIG. 4.
Figure 6:
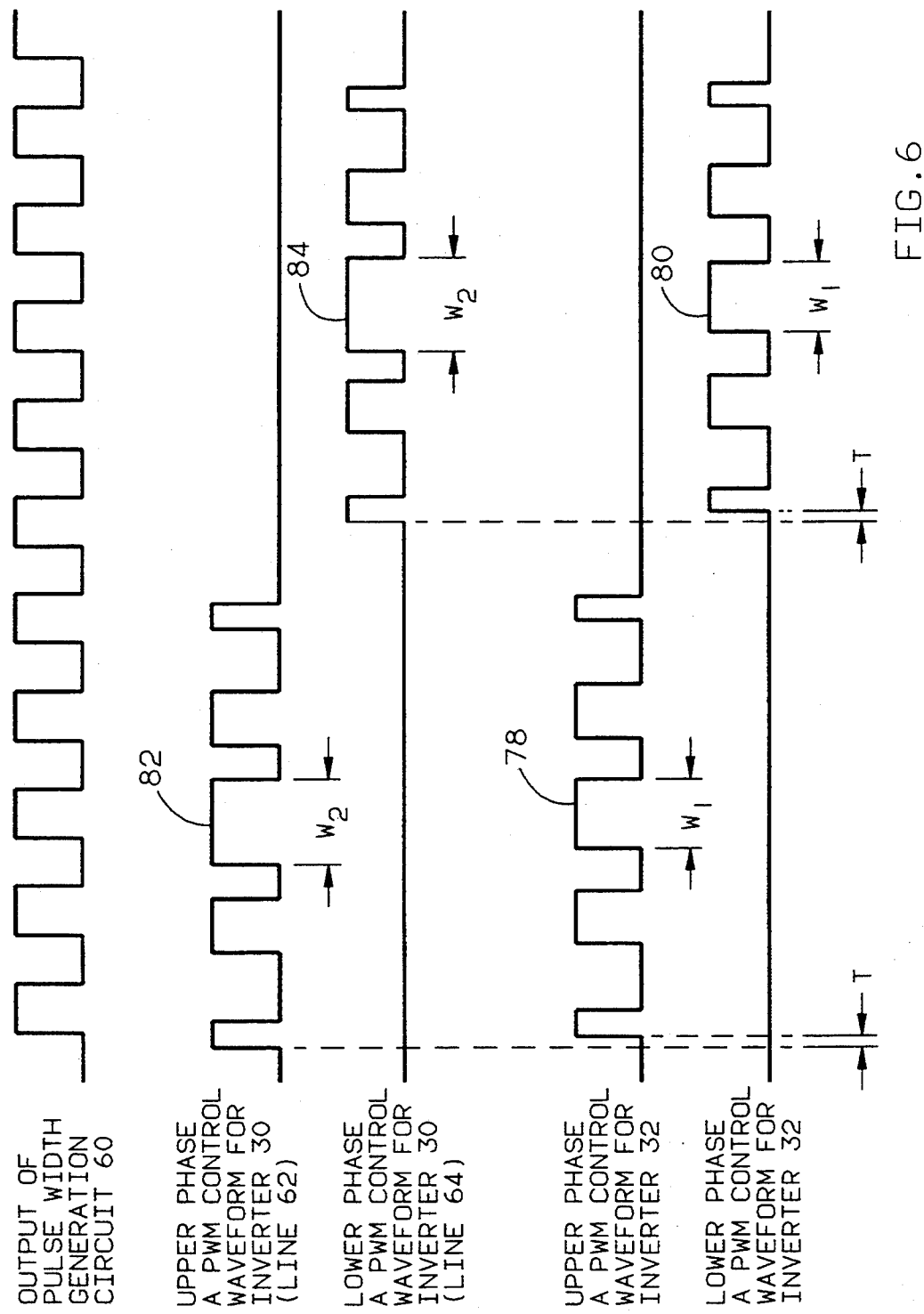
FIG. 6 comprises a set of waveform diagrams illustrating operation of the inverter control of FIG. 5.

FIG. 5 illustrates the DSP 44 in greater detail. The circuits required to produce control waveforms for the phase A switches of the inverters 30, 32 are shown in FIG. 5, it being understood that control waveforms for the phase B and phase C switches of the inverters 30, 32 are obtained by phase shifting the phase A control waveforms 120° and 240°, respectively The signals developed by the detectors 40, 42 of FIG. 4 as well as the POR voltages $V_{PORA}$, $V_{PORB}$ and $V_{PORC}$ are converted to digital signals by an analog/digital converter 50 and are supplied to a module 52. The module 52 effects a low pass filter function and further conducts a fast Fourier transform (FFT) analysis on the POR voltages $V_{PORA}$, $V_{PORB}$ and $V_{PORC}$. The module 52 develops command signals on lines 54, 56 that are provided to a pulse-width correction circuit. Referring also to FIG. 6, the correction circuit 58 receives a square wave developed by a pulse-width generation circuit 60 and, in accordance with the command signals on the lines 54, 56 develops phase A PWM control waveforms which are supplied to the base drive and isolation circuit 46.

More particularly, the signal on the line 54 comprises a magnitude control signal which determines the widths of pulses in the PWM control waveforms for the inverter 30. The signal on the line 56 comprises an offset control signal which controls the positions of pulse centers in the PWM control waveforms for the inverter 30 to eliminate DC content in the phase output with respect to the voltage on the DC link conductor 16b. The pulse-width correction circuit 58 develops upper and lower phase A PWM control waveforms on lines 62, 64 for the upper and lower phase A switches Q1, Q2, respectively, of the inverter 30. The waveforms shown in FIG. 6 assume that five pulses per half-cycle are to be produced. It should be noted that a different number of pulses per half-cycle may be produced depending upon the acceptable level of harmonic content in the inverter output.

The signals on the lines 62, 64 are passed to a variable delay circuit 66 which is responsive to a command on a line 68 from the module 52. The variable delay circuit shifts PWM control waveforms for the phase A switches of the inverter 32 relative to the control waveforms on the lines 62, 64 by an amount dependent upon the magnitude of the signal on the line 68. This shift is seen in FIG. 6 as a variable phase delay T and is controlled to remove lower order harmonics in the combined output.

Following the block 66, a pair of blocks 70, 72 establish pulse widths for pulses in the PWM control waveforms for the phase A switches of the inverter 32. The block 70 is responsive to a command signal on a line 74 and modulates the pulse widths developed by the block 66 to minimize DC content in the output of the inverter 32. The block 72 is responsive to a command signal on a line 76 and further adjusts pulse widths in the PWM control waveforms for the phase A switches of the inverter 32 to reduce or otherwise modify the amplitudes of one or more higher order harmonics in the output of the generating system 10. The circuits 70, 72 may modify the widths of a single one or multiple pulses in the PWM control waveforms. For example, as seen in FIG. 6, the width of a center pulse 78 in the upper phase A PWM control waveform for the inverter 30 and the width of a center pulse 80 in the lower phase A PWM control waveform for the inverter 32 may be made narrower than the widths of corresponding center pulses 82, 84 in the upper and lower phase A PWM control waveforms for the inverter 30. This narrowing can be symmetric or assymmetric about the pulse center.

It should be noted that the circuits shown in FIG. 5 are exemplary in the sense that some or all may be replaced by other circuits which effect the same result. Also, it should be noted that some of the circuits shown in FIG. 5, and the functions effected thereby, may be omitted, if desired. For example, the block 66 may be omitted and replaced by a circuit that provides a fixed phase shift between corresponding PWM control waveforms for the inverters 30, 32, if desired.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for a DC/AC converter system having first and second DC/AC converters that produce converter outputs and means for combining the converter outputs to produce an AC output waveform having a fundamental component and a harmonic component, comprising:

means for isolating the harmonic component in the AC output waveform and detecting the magnitude thereof; and means responsive to the isolating means for developing first and second pulse-width modulated (PWM) control waveforms for controlling the first and second DC/AC converters, respectively, including means for phase delaying the second PWM control waveform relative to the first PWM control waveform to in turn regulate the magnitude of the harmonic component.

2. The control of claim 1, wherein the developing means further includes means for adjusting pulse widths of selected pulses in one of the PWM control waveforms in dependence upon the magnitude of the harmonic component.

3. The control of claim 1, wherein the developing means further includes means for adjusting pulse widths of selected pulses in both of the PWM control waveforms in dependence upon the magnitude of the harmonic component.

4. The control of claim 1, wherein the isolating means further includes means for sensing a magnitude of a DC component in one of the converter outputs and wherein the developing means is further responsive to the sensing means.

5. The control of claim 1, wherein the isolating means further includes means for sensing a magnitude of DC components in both of the converter outputs and wherein the developing means is further responsive to the sensing means.

6. The control of claim 1, wherein the developing means is further responsive to a magnitude of the fundamental components of the AC output waveform.

7. A DC/AC converter system, comprising:
first and second DC/AC converters that produce converter outputs;
an interphase transformer that combines the converter outputs to produce an AC output waveform having a fundamental component and harmonics thereof; and
a digital signal processor having means for isolating harmonics in the AC output waveform and detecting the magnitudes thereof and means responsive to the detecting means for developing first and second pulse-width modulated (PWM) control waveforms for controlling the first and second DC/AC converters, respectively, wherein the second PWM control waveform is phase delayed relative to the first PWM control waveform by a phase delay dependent upon magnitudes of harmonics in the AC output waveform and wherein widths of pulses in the PWM control waveforms are controlled in dependence upon magnitudes of harmonics in the AC output waveform.

8. The DC/AC converter system of claim 7, wherein the widths of pulses in the PWM control waveforms are further controlled in accordance with a magnitude of the fundamental component of the AC output waveform.

9. The DC/AC converter system of claim 7, further including means for sensing magnitudes of DC components in the converter outputs and wherein the widths of pulses in the PWM control waveforms are further controlled in accordance with the magnitudes of the DC components.

10. A DC/AC converter system, comprising:
first and second DC/AC converters each of which produces a plurality of phase outputs;
an interphase transformer that combines corresponding phase outputs of the first and second DC/AC converters to produce a plurality of AC output waveforms wherein each output waveform includes a fundamental component and harmonics of the fundamental component; and
a digital signal processor having means for isolating harmonics in the AC output waveforms and detecting the magnitudes of the harmonics and means responsive to the detecting means and the phase outputs of the DC/AC converters for developing first and second sets of pulse-width modulated (PWM) control waveforms for controlling the first and second DC/AC converters, respectively, wherein the second PWM control waveform is phase delayed relative to the first PWM control waveform by a phase delay dependent upon magnitudes of harmonics in the AC output waveforms and wherein widths of pulses in the PWM control waveforms are controlled in dependence upon magnitudes of harmonics in the AC output waveforms.

11. The DC/AC converter system of claim 10, wherein the widths of pulses in the PWM control waveforms are further controlled in accordance with a magnitude of the fundamental component of each AC output waveform.

12. The DC/AC converter system of claim 11, further including means for sensing magnitudes of DC components in the converter outputs and wherein the widths of pulses in the PWM control waveforms are further controlled in accordance with the magnitudes of the DC components.

* * * * *